United States Patent Office 3,098,847
Patented July 23, 1963

3,098,847
DISAZO DYES
Ermanno Gaetani, Milan, Italy, assignor to Aziende Colori Nazionali Affini, A.C.N.A., S.p.A., Milan, Italy, a corporation of Italy
No Drawing. Filed Apr. 14, 1960, Ser. No. 22,123
Claims priority, application Italy Dec. 15, 1959
6 Claims. (Cl. 260—187)

An object of the present invention is to provide certain new water insoluble disazo dyes, having the general Formula A

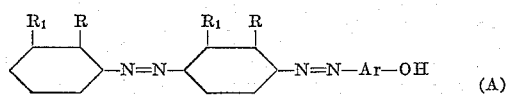

wherein Ar is selected from the group consisting of carboxyphenyl, and carboxynaphthyl groups, which may be further substituted with alkyl groups, and R and $R_1$ are selected from the group consisting of hydrogen and methyl groups. When Ar is a phenyl nucleus then R is hydrogen and $R_1$ is a methyl group, while when Ar is a naphthyl nucleus then R is a methyl group and $R_1$ is hydrogen.

The dyes of the above mentioned general Formula A are suitable for the direct dyeing of polyolefin materials by simple application at the boiling temperature of the dyeing bath.

Among the dyes of general Formula A, the following have been shown to be particularly suitable for dyeing polyethylene and polypropylene materials:

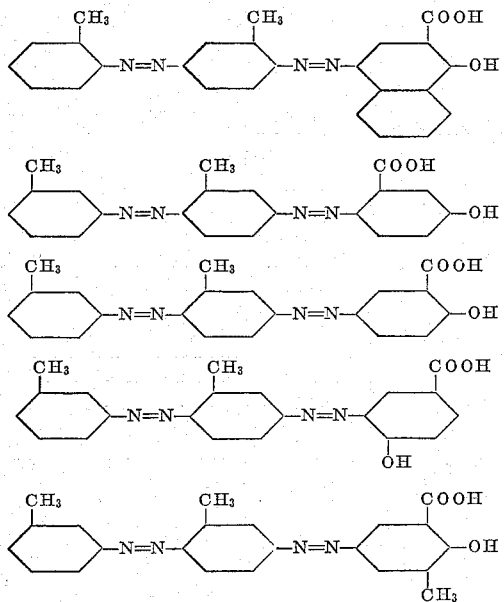

The compounds of general Formula A are obtained by coupling, in the presence of a strong base, one mol of an amino azo compound of the type

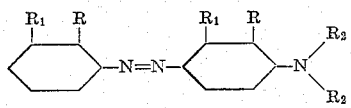

wherein R and $R_1$ have the above mentioned meaning and $R_2$ is hydrogen and, with one mol of a compound of the type HArOH, wherein Ar has the above mentioned meaning.

The following examples will further illustrate the present invention without limiting its scope (all parts are by weight unless otherwise indicated).

Example 1

22.5 g. 4-amino-2,3'-dimethylazobenzene are diazotised in a conventional manner. The diazo azo compound thus obtained is added to a solution of 15 g. 2-hydroxy-benzoic acid in 200 g. water and 28 g. sodium hydroxide solution also adding 50 g. sodium acetate.

The diazo dye thus formed is filtered, washed and dried. It consists of a brown-yellow powder (melting point 80° C.) having the following formula:

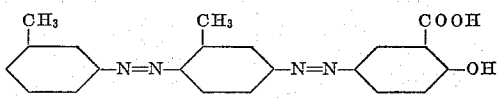

Upon examination by paper chromatography it shows a uniform yellow spot which turns to brownish-violet either with acids or alkalies.

Example 2

22.5 g. 4-amino-3,2'-dimethyl-azobenzene are diazotised in a conventional manner. The diazo-azo compound thus obtained is coupled as described in Example 1 with 4-hydroxy-benzoic acid in place of 2-hydroxy-benzoic acid. The disazo dye, which is obtained as a brown powder (melting point: 75° C.), has the formula:

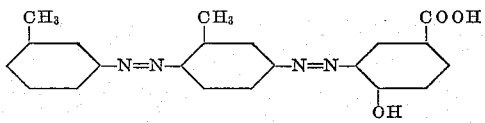

Upon examination by paper chromatography it shows a uniform yellow spot which turns to red with alkalies and to a brownish shade with hydrochloric acid.

Example 3

A dye having the formula

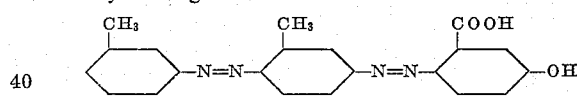

is obtained by operating as in Examples 1 and 2 but using 3-hydroxy-benzoic acid as coupling agent.

A disazo dye is obtained as a brown powder (decomposition point: 222° C.).

Upon examination by paper chromatography it gives a uniform yellow spot which turns to red with caustic alkalies and to a brownish shade with hydrochloric acid.

Example 4

22.5 g. 4-amino-3,2'-dimethyl-azobenzene are diazotised in a conventional manner. The resulting diazo-azo compound is added to a solution of 16 g. of the methyl ester of 2-hydroxy-benzoic acid in 200 g. water and 14 g. sodium hydroxide solution, adding also 50 g. sodium acetate.

The disazo dye thus obtained is filtered, washed and dried. It consists of a brown-yellow powder (melting point: decomposition 115° C.) having the formula:

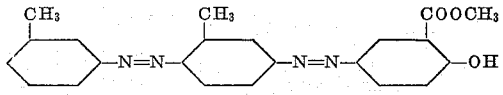

Upon examination by paper chromatography the dye shows a uniform yellow spot which turns to brown-red with alkalies and remains unaltered with acids.

Example 5

This dye is obtained by operating as described in Examples 1, 2 and 3, but using 16.5 g. cresotinic acid as coupling agent.

The disazo dye thus obtained, has the formula:

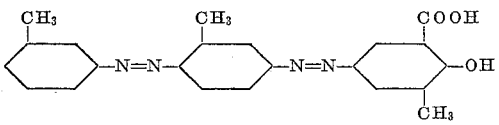

and consists of a brown powder (melting point: 160° C.).

Upon examination by paper chromatography it shows a uniform yellow spot which turns to brownish-violet with acids or alkalies.

Example 6

22.5 g. 4-amino-3,2'-dimethyl-azobenzene are diazotised as usual. The diazo-azo compound is added to a solution of alpha-hydroxy-2-naphthoic acid (20 g.) in 200 g. water and 28 g. sodium hydroxide solution, further adding 35 g. of a 30% ammonia solution.

A disazo dye is formed which is filtered, washed and dried.

It consists of a dark brown powder (melting point: decomposition 174° C.). This dye has the following formula:

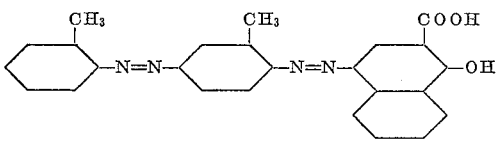

Upon examination by chromatography it shows a uniform reddish spot which turns to blue with alkalies and remains unaltered with acids.

Having thus described my invention, what I desire to secure and claim by Letters Patent is:

1. A disazo dye insoluble in water, selected from the group consisting of dyes of the formulae:

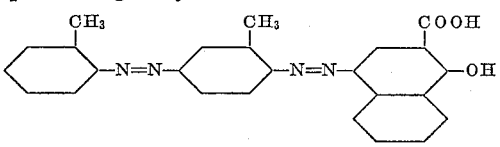

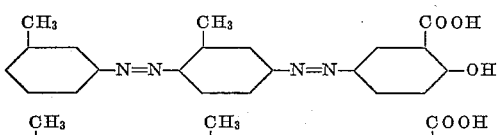

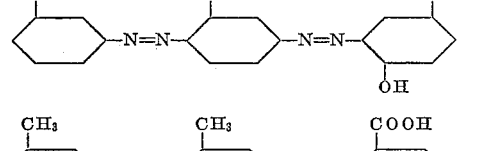

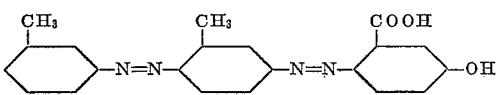

and

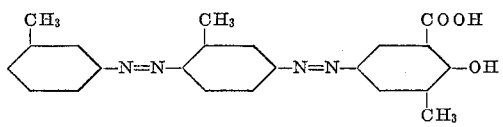

2. A disazo dye, insoluble in water having the formula:

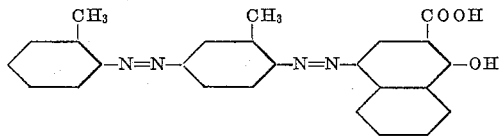

3. A disazo dye, insoluble in water having the formula:

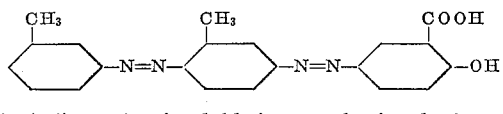

4. A disazo dye, insoluble in water having the formula:

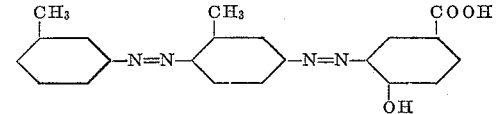

5. A disazo dye, insoluble in water having the formula:

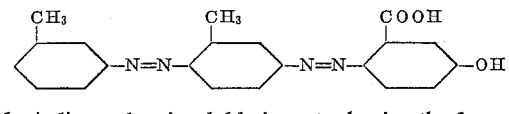

6. A disazo dye, insoluble in water having the formula:

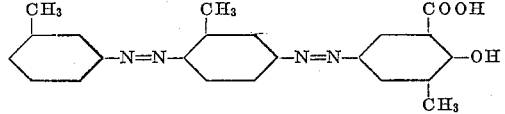

References Cited in the file of this patent

UNITED STATES PATENTS

| | | |
|---|---|---|
| 1,557,265 | Miller | Oct. 13, 1925 |
| 2,782,185 | Merian | Feb. 19, 1957 |

FOREIGN PATENTS

| | | |
|---|---|---|
| 8,154 | Great Britain | 1909 |
| 10,187 | Great Britain | 1909 |
| 262,476 | Germany | July 9, 1913 |

OTHER REFERENCES

Colour Index, 2nd Edition (1956), vol. 3, pages 3212, 3213, C.I. 26520, 26560. (Copy In Library.)